United States Patent
Parr et al.

(10) Patent No.: US 7,016,444 B2
(45) Date of Patent: Mar. 21, 2006

(54) FILTER LOOP STRUCTURE FOR SYNCHRONIZATION IN A MOBILE COMMUNICATION TERMINAL AND A METHOD OF USING THE SAME

(75) Inventors: Michael Parr, Del Mar, CA (US);
Sharath Ananth, San Diego, CA (US);
Long Huynh, San Diego, CA (US);
Drew Barnett, La Jolla, CA (US); Fred Harris, Lemon Grove, CA (US)

(73) Assignee: Hughes Network Systems, LLC, Germantown, MD (US)

( * ) Notice: Subject to any disclaimer, the term of this patent is extended or adjusted under 35 U.S.C. 154(b) by 720 days.

(21) Appl. No.: 10/106,940

(22) Filed: Mar. 26, 2002

(65) Prior Publication Data

US 2002/0150190 A1 Oct. 17, 2002

Related U.S. Application Data

(60) Provisional application No. 60/284,145, filed on Apr. 16, 2001.

(51) Int. Cl.
*H04L 7/00* (2006.01)

(52) U.S. Cl. .................................................. 375/354
(58) Field of Classification Search ............... 375/354, 375/355, 371, 373, 326, 327, 242, 245; 370/304, 370/305
See application file for complete search history.

(56) References Cited

U.S. PATENT DOCUMENTS

| | | | | |
|---|---|---|---|---|
| 3,878,468 A | * | 4/1975 | Falconer et al. | 375/235 |
| 4,403,118 A | * | 9/1983 | Zollner et al. | 607/57 |
| 4,953,186 A | * | 8/1990 | Levy et al. | 375/371 |
| 5,065,412 A | * | 11/1991 | Schenk | 375/362 |
| 5,774,512 A | * | 6/1998 | Bhatt | 375/376 |
| 5,802,491 A | * | 9/1998 | Bush et al. | 701/76 |
| 5,930,374 A | * | 7/1999 | Werrbach et al. | 381/99 |
| 5,982,821 A | * | 11/1999 | Kingston et al. | 375/326 |
| 6,075,387 A | * | 6/2000 | Urbansky | 327/2 |
| 6,148,049 A | * | 11/2000 | Hein | 375/354 |
| 6,314,145 B1 | * | 11/2001 | van Driest | 375/326 |
| 6,549,587 B1 | * | 4/2003 | Li | 375/326 |

* cited by examiner

*Primary Examiner*—Tesfaldet Bocure
*Assistant Examiner*—Vineeta Panwalkar
(74) *Attorney, Agent, or Firm*—Craig Plastrik

(57) ABSTRACT

Filtering loop and method for maintaining synchronization between a receiver and a transmitter reduces overhead and enables more robust operation. The method includes the step of receiving an error signal corresponding to a synchronization parameter. A first order filter is applied to the error signal such that a residual signal results. The method further provides for compensating the residual signal for drift such that the compensated residual signal estimates a rate of change in the residual signal. By compensating the residual signal for drift, difficulties associated with time lag and signal degradation are obviated.

10 Claims, 4 Drawing Sheets

FILTER LOOP STRUCTURE FOR SYNCHRONIZATION IN A MOBILE COMMUNICATION TERMINAL AND A METHOD OF USING THE SAME

This application claims benefit under 35 U.S.C. § 119(c) of a U.S. provisional patent application of Michael Parr et al. entitled "A Filter Loop Structure for Synchronization in Thuraya Hand-Held Terminal", Ser. No. 60/284,145, filed Apr. 16, 2001, the entire content of which incorporated herein by reference.

FIELD OF THE INVENTION

The present generally relates to communication networks. More particularly, the invention relates a filtering loop and method for maintaining synchronization between a receiver and a transmitter that accounts for signal drift.

BACKGROUND OF THE INVENTION

In the communications industry, various protocols, network structures and signaling techniques have evolved to address the ever growing needs of society. The increased mobility of the typical consumer has raised a number of important technical issues. For example, in mobile communication environments, synchronization between the receiver and the transmitter is an issue of particular concern. Specifically, most communication environments require that the receiver be "locked" or "in sync" with the transmitter in terms of frequency and timing. This requirement presents unique difficulties in the mobile setting for a number of reasons.

For example, when the receiver is a hand-held terminal such as in various commercially available user terminals, synchronization can be affected by variations in environmental conditions as well as channel conditions. Environmental conditions include receiver temperature, while channel conditions include line of sight (LOS) positioning with respect to the transmitter (such as a satellite), and relative motion between the receiver and the transmitter (i.e., the doppler effect). It is therefore desirable to provide a mechanism within the receiver that enables changes in timing and frequency to be tracked, even during conditions that typically cause signal degradation and loss of synchronization.

The conventional receiver includes a modem (operating under one or more protocols such as CDMA, TDMA, and QPSK), and a synchronization system. The synchronization system includes an error signal estimator, a filter loop structure and a piece of hardware on which the filtered version of the error estimates are applied. The demodulator typically provides the synchronization system with an error signal corresponding to a synchronization parameter such as frequency or time. In turn, the synchronization system generates a final frequency or time adjustment signal, which is used by the hardware. The hardware applies this correction and hence attempts to maintain synchronization with the transmitter. The hardware typically does not have infinite precision, in that it can only handle discrete steps of corrections. Hence the hardware can be looked as to have an in-built quantizer. The error signal estimator that is a part of the synchronization system estimates time and frequency error parameters on a burst by burst basis. These estimates are often relatively noisy since the incoming bursts are often corrupted with channel noise. Thus, the error signal needs to be filtered before being applied to the hardware. Typically, for frequency control the hardware is a Voltage Controlled Oscillator (VCO) which is used to change the receive and transmit frequency of the receiver. For time control the filtered error signal is applied to the sampling time instant of the Analog to Digital (A/D) converter.

While the filtering loops commonly used to implement the above-described smoothing function are acceptable under certain circumstances, considerable room for improvement remains. For example, it has been determined that conventional first order filters cannot compensate for the ramp nature of drift. Thus, the output of most filter loops lags the input. Furthermore, when signal degradation occurs as a result of the above-described environmental and channel conditions at the same time that there is drift in the error signal, the modem can loose synchronization with the network. This loss in synchronization occurs because the modem has no mechanism of predicting the manner in which the input frequency and timing is varying. Loss of synchronization results in dropped calls (during periods of activity) and failures to recognize the network (during periods of inactivity). It is therefore desirable to provide a mechanism for estimating a rate of change in an error signal in order to maintain synchronization between a receiver and a transmitter.

SUMMARY OF THE INVENTION

The above and other objectives are substantially achieved by a system and method employing a filtering loop, for maintaining synchronization between a receiver and a transmitter in accordance with the principles of the present invention. The system and method includes the step of receiving an error signal corresponding to a synchronization parameter. A first order filter is applied to the error signal such that a residual signal results. The method further provides for compensating the residual signal for drift such that the compensated residual signal estimates a rate of change in the residual signal and enables synchronization between the receiver and the transmitter. By compensating the residual signal for drift, difficulties associated with time lag and signal degradation are obviated.

In another aspect of the invention, a system and method for compensating a residual signal for a drift is provided. The method includes the step of applying a second order filter to the residual signal such that a correction signal results. The correction signal is forced beyond a predetermined quantization threshold in order to compensate for limitations caused by quantization errors in the receiver.

Further in accordance with the present invention, a system and method employing a special error signal filtering loop is provided. The error signal filtering loop includes a first order filter, a drift compensation module, a quantization compensation module, and an integrator. The first order filter smoothes the error signal such that a residual signal results, where the error signal corresponds to a synchronization parameter. The integrator integrates a normalized signal such that a final adjustment signal results. The final adjustment signal enables the hardware of the receiver to maintain synchronization between a transmitter and the receiver. In one embodiment, the drift compensation module includes a drift estimator and a quantizer compensator.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute part of this specification. The drawings illustrate various features and embodiments of the invention, and together with the description serve to explain the principles and operation of the invention.

BRIEF DESCRIPTION OF DRAWINGS

The various aspects, advantages and novel features of the present invention will be more readily comprehended from the following detailed description when read in conjunction with the appended drawings, in which.

DETAILED DESCRIPTION OF THE PREFERRED EMBODIMENTS

Figure 1:
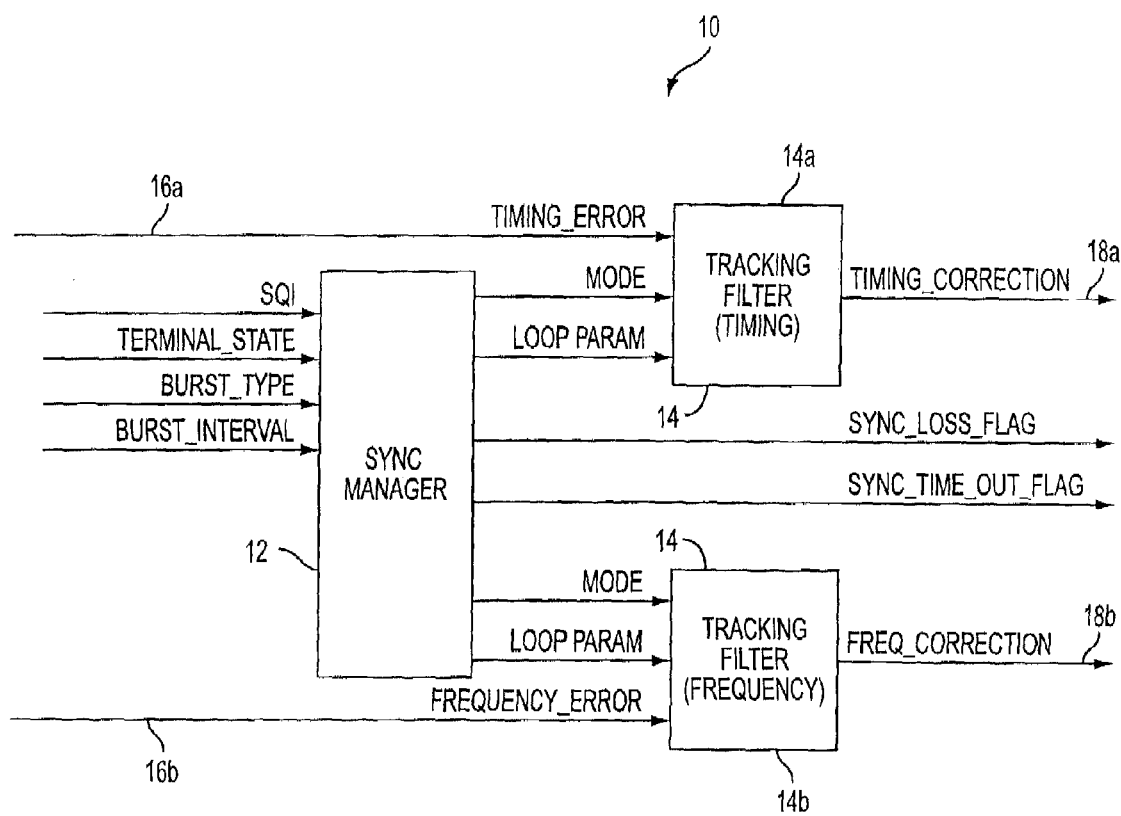
FIG. 1 is a block diagram of an example of a synchronization system in accordance with an embodiment of the present invention.

FIG. 1 illustrates an example of a synchronization system. The synchronization system 10 can be implemented via a digital signal processor (DSP), application specific integrated circuit (ASIC) or other appropriate firmware or hardware device. The synchronization system 10 enables devices such as a commercially available user terminals to maintain both frequency and timing synchronization with a remote transmitter such as a satellite in orbit. It can be seen that a sync manager 12 uses incoming burst data to provide parameter and mode data to a plurality of filtering loops 14. Specifically, a timing filtering loop 14a filters and tracks a timing error signal 16a, while a frequency filtering loop 14b filters and tracks a frequency error signal 16b. The final adjustment signals 18 are passed onto hardware in the receiver for subsequent error correction. Typically the final adjustment signal has more precision than can be handled by the hardware and hence the hardware inherently performs some form of quantization before applying the signal.

Figure 2:
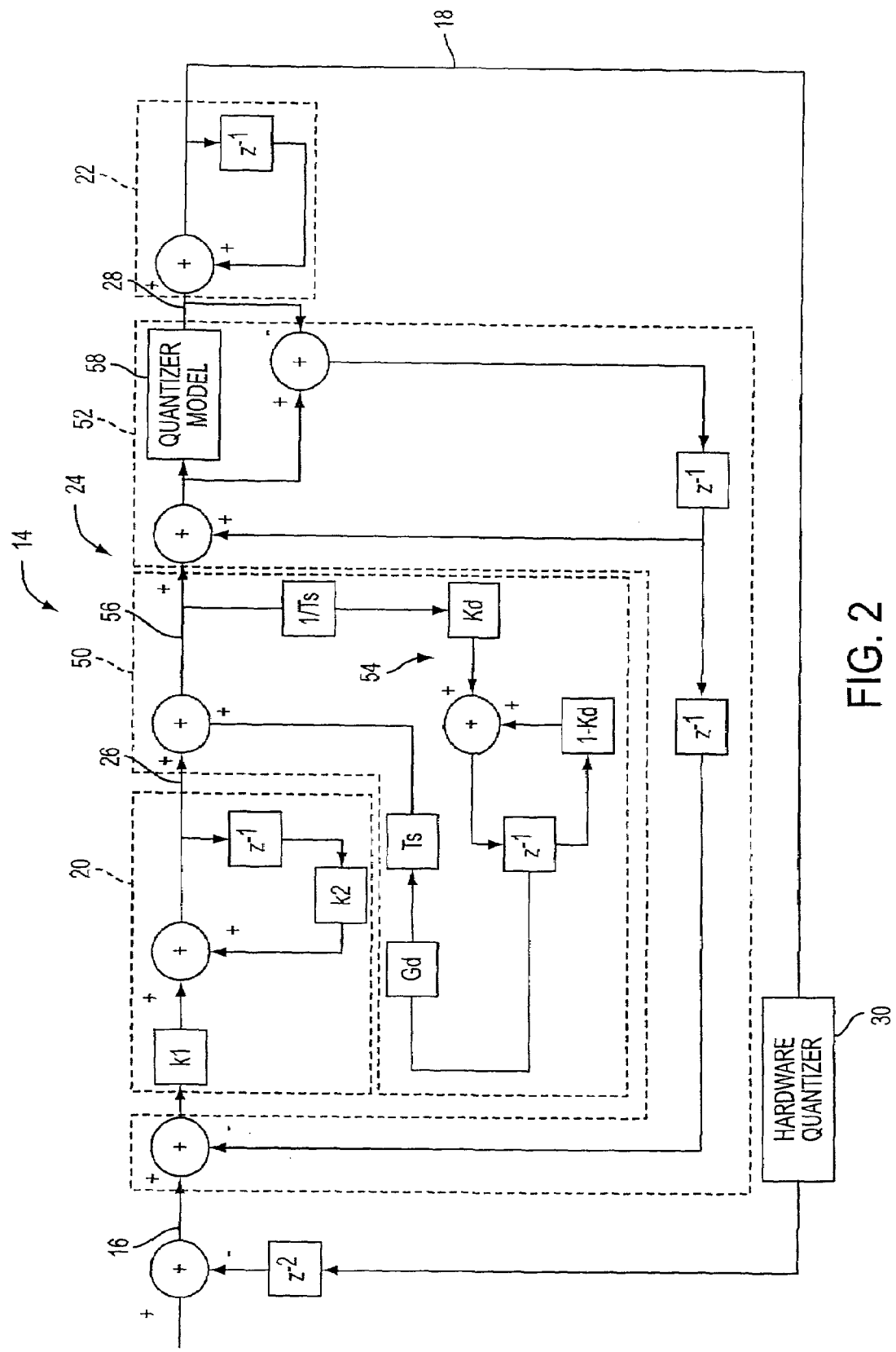
FIG. 2 is a block diagram of an example of an error signal filtering loop employed in the system shown in FIG. 1.

FIG. 2 illustrates the preferred filtering loop 14 in greater detail. It should be noted that the filtering loop 14 can be implemented as either a timing filtering loop 14a or a frequency filtering loop 14b (FIG. 1), and is therefore not limited to a specific synchronization parameter. It should also be noted that while the present invention will be primarily described with respect to a hand held communication terminal, the scope of the invention is not so limited. In fact, any receiver that is susceptible to drift can benefit from the principles described herein. Notwithstanding, mobile communication devices have a number of aspects for which the filtering loop 14 is uniquely suited.

Generally, it can be seen that the filtering loop 14 has a first order filter 20, an integrator 22 and a drift compensation module 24. The first order filter 20 smoothes the error signal 16 such that a residual signal 26 results. As already discussed, the error signal 16 corresponds to a synchronization parameter such as timing or frequency. The integrator 22 integrates a normalized signal 28 such that a final adjustment signal 18 results. As discussed above, the final adjustment signal 18 enables a hardware quantizer 30 of a receiver to maintain synchronization between a transmitter and the receiver.

The drift compensation module 24 generates the normalized signal 28 based on the residual signal 26 such that the normalized signal 28 estimates a rate of change in the residual signal 26. By estimating the rate of change in the residual signal 26, the filtering loop 14 provides significant advantages over conventional loops. For example, lag between the final adjustment signal 18 and the incoming error signal 16 can be reduced or eliminated. Furthermore, when conditions that normally cause loss of synchronization are present, the filtering loop 14 is able to approximate the error signal until the conditions are no longer present. Thus, when the receiver experiences environmental changes such as temperature fluctuations or channel quality changes such as relative velocity fluctuations with respect to the transmitter, synchronization can be maintained.

Figure 3:
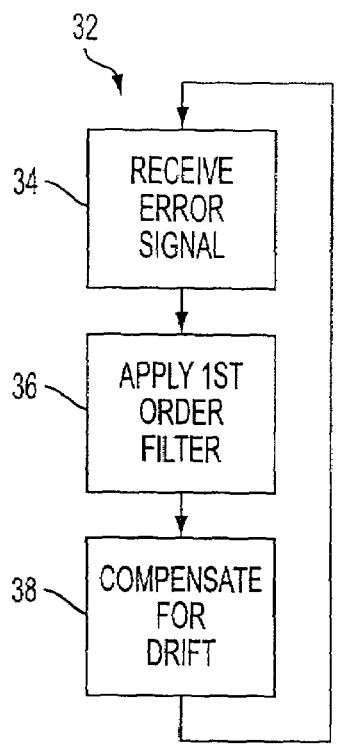
FIG. 3 is a flow chart of an example of a method for maintaining synchronization between a receiver and a transmitter performed by the system shown in FIG. 1 in accordance with an embodiment of the present invention.

Turning now to FIG. 3, it will therefore be appreciated that the present invention also provides a method 32 for maintaining synchronization between a receiver and a transmitter. Generally, the method 32 includes the step 34 of receiving an error signal corresponding to a synchronization parameter. A first order filter is applied to the error signal at step 36 such that the residual signal results. The method 32 further provides for compensating the residual signal for drift at step 38 such that the compensated residual signal (i.e., the normalized signal) estimates a rate of change in the residual signal.

Figure 4:
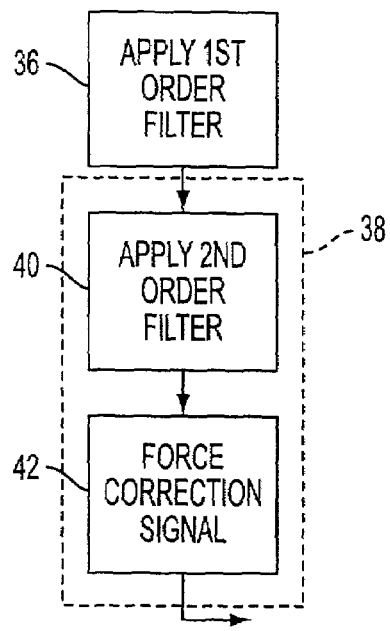
FIG. 4 is a flow chart of an exemplary process for compensating a residual signal for drift performed by the system shown in FIG. 1 in accordance with an embodiment of the present invention.

FIG. 4 illustrates the preferred approach to compensating the residual signal for drift at step 38. Specifically, it can be seen that step 40 provides for applying a seconded order filter to the residual signal such that a correction signal results. The correction signal is forced beyond a predetermined quantization threshold at step 42 in order to compensate for quantization errors in the hardware quantizer.

Figure 5:
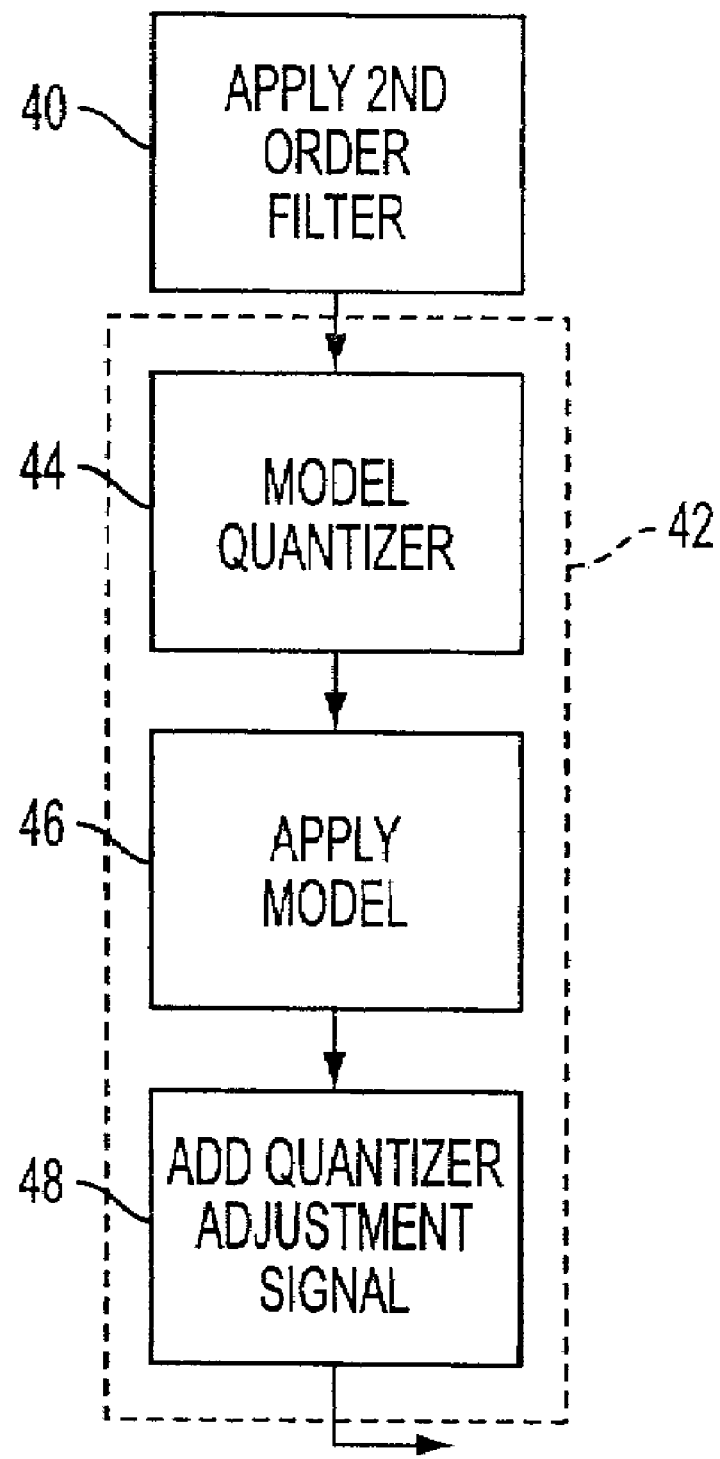
FIG. 5 is a flow chart of an exemplary process for forcing a correction signal beyond a predetermined quantization threshold performed by the system shown in FIG. 1 in accordance with an embodiment of the present invention.

Turning now to FIG. 5, the preferred approach to forcing the correction signal beyond the predetermined quantization threshold is shown in greater detailed at step 42. Specifically, it can be seen that step 44 provides for modeling the quantization of the receiver hardware, which depends specifically upon the hardware being used. It should be noted that this step is typically done offline and is therefore not part of the real time execution of step 42. Step 44 is therefore shown in this position to facilitate discussion only. Once the model has been computed offline at step 44, it is then implemented at step 46 into the filter loop 58. It will be appreciated that step 46 is run in real time, though step 44 is not. It can also be seen that the quantizer model 58 (FIG. 2) is applied to the correction signal at step 46 such that the quantizer adjustment signal results. Step 48 provides for adding the quantizer adjustment signal to the correction signal. When this filter loop structure is used in real time, the combination of 46 and 48 reduce the errors caused by quantization in hardware.

Returning now to FIG. 2, the filtering loop 14 will be described in greater detail. It can be generally seen that the drift compensation module 24 preferably includes a drift estimator 50 and a quantizer compensator 52.

Drift Estimator

Generally, the drift estimator 50 applies a filter 54 to the residual signal 26 such that a correction signal 58 results. It will therefore be appreciated that drift is estimated by filtering the residual signal 20, where the residual signal 28 is defined as the filtered version of the input estimates. Thus, drift is considered as the rate of change of estimates. It should be noted that after applying the first order filter 20, the result is the residual corrections on a per burst basis. Thus, a filtered version of the residual corrections yields the rate of change of corrections, which is the drift. It can be seen that Kd is the filter parameter by which the response time of the second order filter 54 can be varied. Gd is the constant which allows the drift estimator 50 to be selectively enabled and disabled depending upon the strength of the received burst. Thus, selling Gd equal to zero turns off the drift portion of the filtering loop 14 and selling Gd equal to one turns on drift estimation.

It is important to note that the filtering loop 14 is run on different channels such as logical channels, traffic channels and power control channels. Each of these channels typically has different amounts of time between bursts. For example, in one system, the logical channel BCCH has a burst every 320 ms, while the traffic channel has bursts every 40 ms. Since filtering loop 14 is being used for all of the different channels, a mechanism for keeping track of the drift on a per channel basis is needed. Thus, parameters Ts and 1/Ts are used to keep track of the drifts. By referencing the response settings to the fastest burst spacing of the channels (namely, 40 ms) the drift estimator 50 functions as though all bursts are coming in at 40 ms. If this is not the case, Ts and 1/Ts are changed to normalize the values. For example, if the bursts are at 40 ms intervals, Ts and 1/Ts are set to 1, whereas if the burst spacing is 320 ms, the parameter 1/Ts is set to 8 and Ts is set to ⅛.

Quantizer Compensator

It should be noted that the timing corrections output from the timing filtering loop control the sample time of the analog to digital (A/D) converter in the filter chain. This timing correction needs to be fed in step sizes depending upon the A/D converter. For example, the A/D converter in one system has a step size of $1/40^{th}$ of a symbol. Similarly, the frequency corrections that are output from the frequency filtering loop control the frequency corrections that are applied to receive bursts. Thus, the compensations are quantized to discrete numbers and do not provide infinite resolution. The loops themselves, on the other hand, may be of infinite precision or may be limited to some precision depending upon the number of bits used in the filtering loops. In fact, when the precision of the filtering loop 14 and the precision of the hardware quantizer 30 do not match, an interesting effect is produced.

Consider, for example, a hardware quantizer having a step size of plus or minus one. This means that inputs such as 1.3 and 1.9 are quantized to 1, and inputs of 2.1 and 2.9 are quantized to 2. If a constant value under the threshold value of 1 is output from the filtering loop 14, after quantization the effective change to be applied is zero. In the absence of drift estimation this result can represent a steady state condition. In accordance with an embodiment of the present invention, however, the drift estimator 50 continuously detects 0.3 coming out of the loops and estimates that drift is occurring and begins to compensate for it. Simply put, the drift compensation now ramps in an effort to compensate for a drift that does not exist. The value of the correction signal 56 is increased until the output is large enough to cross the quantizer threshold Once the output is forced beyond the quantizer threshold, a correction is applied to the system causing the input to go negative. The steady state condition of the system is now for the filtering loop 14 to output values above and below the quantizer threshold. The quantizer compensator 52 accelerates this process by adding the quantizer adjustment signal to the correction signal output from the second order filter, without affecting what is coming out of the drift estimation process in 54. It should be noted that the quantizer compensation process must take into consideration the channel changes and corresponding Ts parameter changes when used with a multi-channel system.

With regard to the first order filter 20, it will be appreciated that the error signal 16 constitutes an instantaneous frequency or time offset estimate from the demodulator (not shown). Typically this estimate is noisy since the burst coming in is often corrupted by channel noise. The first order filter 20 performs smoothing with coefficients given by k1 and k2. By varying k1 and k2, the time constants of the loop can be changed as desired. With regard to the integrator 22, it will be appreciated that this component enables the generation of an absolute value of corrections to be applied to the hardware quantizer 30.

An embodiment of the present invention therefore uses the drift estimator 50 and the quantizer model 58 to provide synchronization, which is a key system design driver in model satellite systems. The resulting filtering loop 14 conserves precious power and bandwith resources, and minimizes the overhead required to support synchronization. Furthermore, the low overhead is complemented with robust operation. For example, terminals employing the filtering loop 14 can maintain synchronization with very poor channel conditions including frequency ramps due to platform acceleration and leak the outages.

Those skilled in the art can now appreciate from the foregoing description that the broad teachings of the present invention can be implemented in a variety of forms. Therefore, while this invention can be described in connection with particular examples thereof, the true scope of the invention should not be so limited since other modifications will become apparent to the skilled practitioner upon a study of the drawings, specification and following claims.

What is claimed is:

1. A method for maintaining synchronization between a receiver and a transmitter, the method comprising the steps of:

receiving an error signal corresponding to a synchronization parameter; applying a first order filter to the error signal such that a residual signal results;

compensating the residual signal for drift such that the compensated residual signal estimates a rate of change in the residual signal and enables synchronization between the receiver and the transmitter;

applying a second order filter to the residual signal such that a correction signal results;

forcing the correction signal beyond a predetermined quantization threshold;

modeling a quantizer of the receiver;

applying the quantizer model to the correction signal such that a quantizer adjustment signal results; and adding the quantizer adjustment signal to the correction signal.

2. The method of claim 1 further including the step of repeating the applying and adding steps until the correction signal exceeds the predetermined quantizer threshold.

3. A method for maintaining synchronization between a receiver and a transmitter, the method comprising the steps of:

receiving an error signal corresponding to a synchronization parameter;

applying a first order filter to the error signal such that a residual signal results;

compensating the residual signal for drift such that the compensated residual signal estimates a rate of change in the residual signal and enables synchronization between the receiver and the transmitter;

applying a second order filter to the residual signal such that a correction signal results;

forcing the correction signal beyond predetermined quantization threshold;

selecting a response time of the second order filter in accordance with a desired filter response; and adjusting the response time on a channel-by-channel basis such that each receiver channel has a corresponding response setting.

4. The method of claim 3 further including the step of referencing the response settings to a fastest burst spacing of the channels.

5. A method for compensating a residual signal for drift, the method comprising the steps of:

applying a second order filter to the residual signal such that a correction signal results;

forcing the correction signal beyond a predetermined quantization threshold;

modeling a quantizer of a receiver;

applying the quantizer model to the correction signal such that a quantizer adjustment signal results; and adding the quantizer adjustment signal to the correction signal.

6. The method of claim 5 further including the step of repeating the applying and adding steps until the correction signal exceeds the predetermined quantizer threshold.

7. A method for compensating a residual signal for drift, the method comprising the steps of:

applying a second order filter to the residual signal such that a correction signal results;

forcing the correction signal beyond a predetermined quantization threshold;

selecting a response time of the second order filter in accordance with a desired filter response; and adjusting the response time on a channel-by-channel basis such that each receiver channel has a corresponding response setting.

8. The method of claim 7 further including the step of referencing the response settings to a fastest burst spacing of the channels.

9. A method for maintaining synchronization between a mobile receiver and a transmitter, the method comprising the steps of:

receiving an error signal from a demodulator of the receiver, the error signal corresponding to a synchronization parameter;

applying a first order filter to the error signal such that a residual signal results;

selecting a response time of a second order filter in accordance with a desired filter response;

applying the second order filter to the error signal such that a correction signal results;

forcing the correction signal beyond a predetermined quantization threshold such that a compensated residual signal results, the compensated residual signal estimating a rate of change in the residual signal;

modeling a quantizer of the receiver;

applying the quantizer model to the correction signal such that a quantizer adjustment signal results; and adding the quantizer adjustment signal to the correction signal.

10. An error signal filtering loop comprising:

a first order filter for smoothing the error signal such that a residual signal results, the error signal corresponding to a synchronization parameter;

an integrator for integrating a normalized signal such that a final adjustment signal results, the final adjustments signal enabling a hardware quantizer of a receiver to maintain synchronization between a transmitter and the receiver; and a drift compensation module for generating the normalized signal based on the residual signal such that the normalized signal estimates a rate of change in the residual signal; and wherein the drift compensation module includes:

a drift estimator for applying a second order filter to the residual signal such that a correction signal results; and a quantizer compensator operatively coupled to the drift estimator, the quantizer compensator forcing the correction signal beyond a predetermined quantization threshold.

* * * * *